United States Patent Office 3,294,194
Patented Dec. 27, 1966

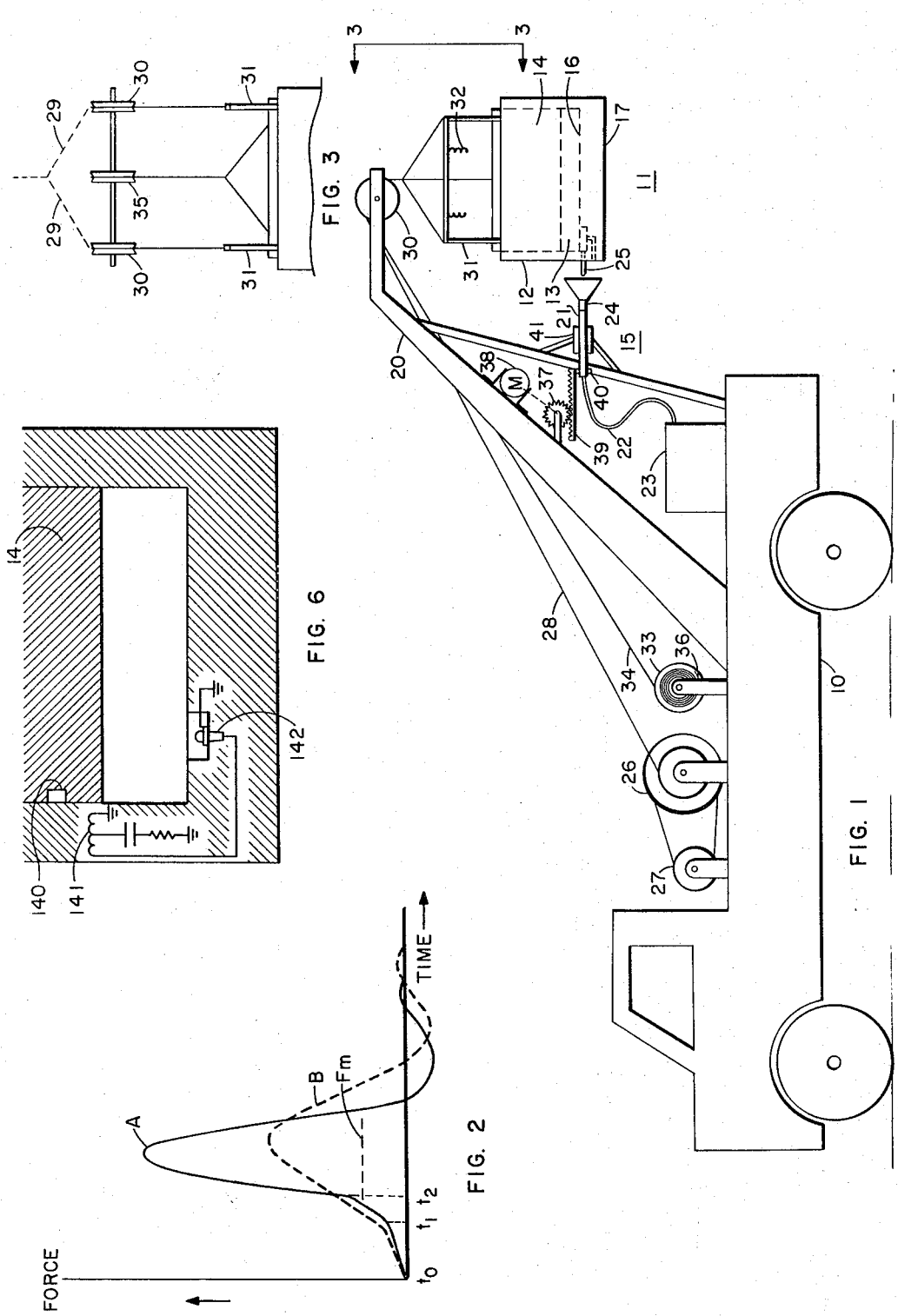

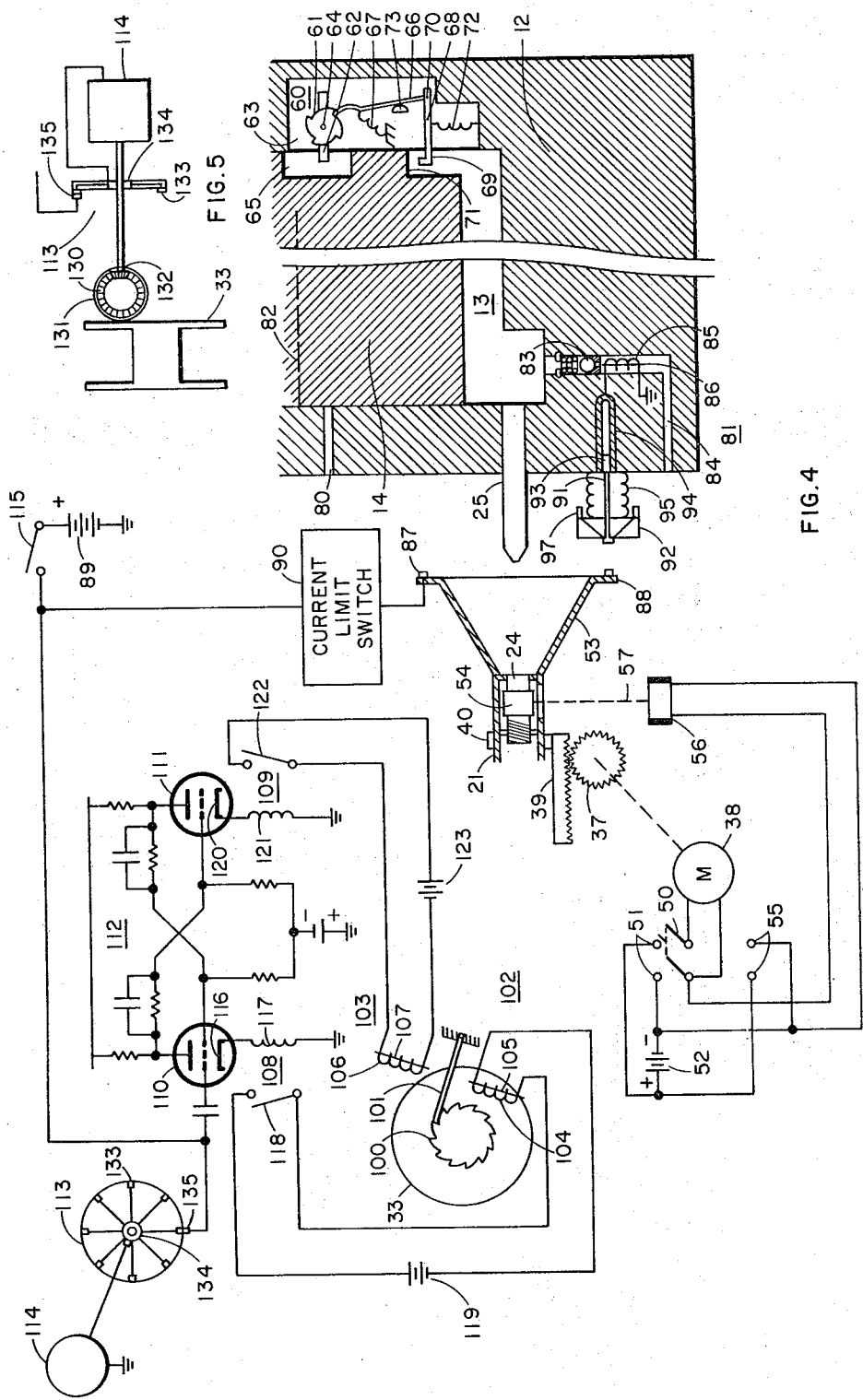

3,294,194
SYSTEM FOR GENERATING SEISMIC WAVES
Raymond W. Sloan, Dallas, Tex., assignor to Mobil Oil Corporation, a corporation of New York
Filed June 18, 1964, Ser. No. 376,001
12 Claims. (Cl. 181—.5)

This invention relates to seismic surveying and more particularly to an apparatus employing an explosive charge for use in a weight-dropping system for generating seismic waves of high amplitude useful in the investigation of subsurface formations.

One technique of seismic surveying involves the generation of seismic waves by dropping a heavy weight to the earth's surface. Seismic waves generated at the point of impact of the weight are transmitted into the earth and a portion of the waves is reflected at the boundaries of subsurface formations. The reflected waves are detected at the earth's surface by geophones positioned at predetermined locations for the production of desired records to obtain information about the configuration of the subsurface formations.

In many instances, however, the top soil of the surface is unconsolidated or loose and much energy is expended or absorbed in compressing the loose soil near the surface. Hence, the resulting seismic wave is of relatively low amplitude.

It is an object of the present invention to provide a novel system for generating seismic waves useful in the investigation of subsurface formations. The system comprises means forming a weight to be dropped from a desired height to the surface of the earth, and means coupled to the weight for raising the weight above the surface of the earth and dropping the weight to the surface. In addition, means is provided for applying an explosive charge to the weight prior to the time that the weight is dropped. Means is also provided for initiating the explosion of the charge when the weight contacts or impacts the earth when dropped to generate a desired seismic wave. The operations are carried out repetitively to generate repetitive seismic waves. The arrangement for raising and dropping the weight comprises a flexible line coupled to the weight and to reel means secured to a ground vehicle.

The weight is employed to compress the ground thereby allowing the explosion to generate a high amplitude signal. In the embodiment disclosed, the weight includes a first member having a chamber formed therein and an inlet leading to at least a portion of the chamber for receiving combustible gas from a supply means. In addition, means is provided for igniting the combustible gas upon contact of the first member with the earth to generate a desired seismic wave.

In a more detailed aspect, the igniting means includes a second member slidably supported at least partially in the chamber. The portion of the chamber for receiving the combustible gas is intermediate the first end of the first member and an adjacent end of the second member. Upon impact of the first member with the earth, the second member moves toward the first end to compress the gas in the chamber and to ignite the gas spontaneously for the generation of the seismic wave.

In a further embodiment, electrical means responsive to the movement of the second member may be employed for initiating combustion of the gas at a desired time upon contact of the first member with the surface of the earth.

For further objects and advantages of the present invention and for a more complete understanding thereof, reference may be had now to the following detailed description taken in conjunction with the accompanying drawings, wherein:

FIGURE 1 is a side elevation illustrating the apparatus of the present invention for use in a weight-dropping system for generating seismic waves;

FIGURE 2 illustrates curves useful in understanding the present invention;

FIGURE 3 is a rear elevation of a portion of the system of FIGURE 1 taken along the lines 3—3;

FIGURE 4 illustrates in more detail the apparatus of the present invention as well as a control system therefor;

FIGURE 5 illustrates in detail a component of the system shown in FIGURE 4; and

FIGURE 6 illustrates a modification of the present invention.

Referring now to FIGURE 1, there is illustrated a system for conducting seismic surveying utilizing the weight-dropping technique. The system comprises a vehicle 10 and support structure mounted thereon for lifting and dropping to the earth's surface, for the generation of seismic signals, the device illustrated at 11. This device is a relatively heavy member. It includes a chamber for containing a combustible gas which is ignited upon contact of the device 11 with the surface, upon which it is dropped, for the production of a seismic signal of high amplitude. More particularly the device 11 comprises a cup-shaped member 12 having a chamber 13 formed therein. Slidably supported within the chamber 13 is a weight member 14. As will be described hereinafter, means illustrated at 15 is provided for injecting a combustible gas under pressure (preferably a mixture of deisel fuel and air) into the chamber 13 between the lower inner surface 16 of chamber 13 and the adjacent end of the weight member 14. In the embodiment disclosed, the injection of the gas raises the weight member 14 to a predetermined height above the surface 16 of the chamber 13. When the device or apparatus 11 is dropped, the bottom portion 17 of member 12 strikes the earth whereby compression and compaction of the soil take place. As the downward movement of member 12 is slowed following contact with the surface, the member 14 continues to travel downward within the chamber 13 a limited distance to further compress the combustible gas. In the present system, the weight of member 14 and other factors are chosen, whereby at the height dropped the maximum pressure imparted to the gas by the member 14 is greater than the minimum pressure required for the gas to ignite spontaneously. Thus, as the member 14 compresses the gas, a point is reached wherein the gas ignites. In the present system, the kinetic energy of the apparatus is employed in part to compact the soil and ignition takes place following compaction. Thus, upon combustion of the gas, additional force is applied to the surface for the generation of a seismic wave of high amplitude.

More particularly, referring to FIGURE 2, curve A reflects the force expected to be imparted to the earth when employing the apparatus of the present invention. Curve B reflects the force imparted only by the change in momentum, for example, of a single and rigid weight, when dropped, and having a mass corresponding to that of apparatus 11. The time of contact with the surface of both apparatus 11 and the weight mentioned in the example above is at $t_0$. In the operation of the present system wherein combustible gas is employed, compaction of the soil takes place between $t_0$ and $t_1$. Compaction lags that produced by the weight of the example mentioned above due to the presence of the gas. Upon dropping apparatus 11 and following compaction, the force increases as illustrated to a time $t_2$ whereupon ignition takes place. Upon combustion of the gas, additional force is produced which increases at an increased rate to a very high value, as illustrated by the peak of curve A. The additional force is accounted for by an additional upward acceleration of the apparatus 11 or its members. In the present system, the additional acceleration is imparted primarily to member 14. Due to the increased force produced, a seismic wave of high amplitude is generated. As illustrated, the frequency also is increased which is desirable in many cases in order to obtain better discrimination in picking the break time of the reflected wave as recorded by a seismic recorder.

In FIGURE 2, the dotted line $Fm$ indicates the point of minimum force required for the combustible gas employed to ignite spontaneously for a given lower surface area of member 14. In the present system, the gas is pressurized above a value corresponding to $Fm$ before ignition takes place due to the fact that the pressure is increasing at a relatively rapid rate. The time of ignition is dependent upon factors which include the weight of the member 14 and the height at which the apparatus is dropped. The weight of the member 14 preferably is of the order of two-thirds of the total weight of the apparatus 11 and in one embodiment may be of the order of two thousand pounds. The height at which the apparatus is dropped may be of the order of 9–10 feet. Other factors which influence ignition are the diameter of member 14 and the particular gas employed. These factors can be varied by those skilled in the art to insure that ignition takes place and at the desired time. In addition, electrical means may also be employed to control the time of ignition of the gas, as will be described hereinafter.

In the present system, following the generation of a seismic wave, the device 11 is lifted by means including boom 20 and vehicle 10 driven to a new drop position in accordance with well-known seismic surveying techniques, for example, as described in United States Patents No. 2,851,121 and No. 2,851,122.

After the device has been lifted, combustible gas is injected into the chamber 13 by means 15 which includes a semiflexible guide 21 having one end coupled by way of a flexible hose 22 to a gas supply 23 and the other end containing member 24 of a push-pull quick connector. The other member 25 of the quick connector is supported in member 12 and leads to the chamber 13. In the filling operation, guide 21 is moved to the right to couple the two members 24 and 25 together to allow the gas to be injected. Prior to the connection of members 24 and 25, the chamber 13 is vented to the atmosphere to remove exhaust gases resulting from a prior cycle. The fresh gases are injected under pressure and force member 14 above the bottom surface 16 of chamber 13, as mentioned above. Suitable latching means, attached to member 12, are provided to limit the upward movement of member 14 to a desired height in order to insure that the chamber is pressurized to the desired value. After the injection of gas, members 24 and 25 are uncoupled and guide 21 backed away from the device 11.

The system for lifting and dropping the device 11 comprises a reel mechanism 26, including a motor 27 mounted on the truck bed for controlling a cable 28, coupled to the member 12 of the device 11. As illustrated, the cable 28 is coupled to the member 12 by way of cable portions 29 (FIGURE 3), extending over pulleys 30 and support structure 31 extending from member 12. In order to lift the device 11, the reel 26 is driven by motor 27 to wind up the cable. The device 11 is dropped by releasing reel 26 whereby the cable 28 is reeled out.

Following combustion of the gas in device 11, upon being dropped, the force generated causes member 14 to rebound upward. Springs 32 are provided to limit the upward travel of member 14. A second reel 33 and cable 34 extending over pulley 35 (FIGURE 3) to member 14 are provided in order to prevent the member 14 from falling downward after it rebounds. This operation is provided in order to facilitate lifting the device 11. The mechanism for preventing downward movement of member 14 following rebound thereof comprises a spring 36 fixedly coupled to reel 33 for maintaining the cable 34 under tension and a ratchet and suitable control mechanism, as will be described hereinafter. After the member 14 is stopped in its upward travel upon rebound following combustion of the gas, the reel 26 winds the cable 28 and the member 12 engages member 14 and lifts it to the starting position.

Referring now to FIGURE 4, there will be given a detailed description of the system and mechanism employed for introducing combustible gas into the chamber 13. Like elements have been given like reference characters of those employed in FIGURE 1.

The mechanism for moving the guide 21 toward and away from device 11 comprises a pinion 37, driven by reversible motor 38, which co-acts with rack 39. Rack 39 in turn is secured to guide 21 by a clamp 40. The guide 21 is slidably supported by support 41 (FIGURE 1).

In the filling operations, reversible motor 38, FIGURE 4, is actuated to move guide 21 toward the device 11 by closing switch 50 to contact terminals 51. This completes a circuit from power supply 52 to the motor to drive the pinion 37 in a direction to move the rack 39 and hence the guide 21 to the right. The conical-shaped end 53 acts to guide the two members 24 and 25 together for connection. These members are commercially available quick-connectors which need only be pushed together to form a fluid-tight connection. Uncoupling of the members 24 and 25 takes place by pulling back an actuating ring illustrated at 54. When uncoupled, a valve, not shown but provided in member 24, closes to prevent the escape of gas. When the chamber 13 has been pressurized to the desired value, the members 24 and 25 are uncoupled and the guide 21 is backed away from the device 11 by moving switch 50 to contact terminals 55. This applies energizing current to motor 38 in the reverse direction and in addition actuates coil 56 of a solenoid to allow the armature, illustrated at 57, to pull back the actuating ring in order to allow the members 24 and 25 to be uncoupled. Suitable delay means may be employed to delay application of power to motor 38 to allow coil 56 to be actuated before motor 38 is actuated.

In the injection of fresh combustible gases into chamber 13, a plurality of latches, one of which is illustrated at 60, are provided for limiting the upward movement of the member 14 in order to obtain the desired quantity of pressurized gas within the chamber 13. As illustrated, latch 60 comprises a ratchet 61 and an arm 62 which are supported for rotation within chamber 63 formed in the wall structure of member 12. The support means comprises shaft 64 to which ratchet 61 and arm 62 are fixedly coupled. In addition, upon rotation of arm 62, the ends thereof extend into chamber 65 formed in the member 14. A pawl 66 biased by tension spring 67 is provided to control the position of the ratchet 61 and hence of the arm 62. Pivotally supported at 68 is an impact member 69 which also is pivotally coupled to pawl 66 at 70. When combustible gas is injected into the chamber 13, the arm 62 is in the position shown. Hence, the upward movement of the member 14 is limited by the arms 62 of the plurality of latches 60. When the apparatus 11 is dropped, however, the member 14 moves downward and shoulder 71 of the member 14 contacts impact member 69 to force the pawl 66 upward, thereby rotating the ratchet 61 counterclockwise ninety degrees. This moves arm 62 out of the chamber 65, thereby allowing the member 14 to move downward and then upward upon rebound following combustion of the gas. As member 14 moves upward upon rebound, shoulder 71 moves away from impact member 69 and tension spring 72 pulls pawl 66 to the lower position shown. As mentioned previously, upon rebound of member 14, reel 33 and suitable control mechanism act to prevent member 14 from falling downward.

As the member 12 is reeled upward, it engages and lifts member 14. During the upward travel of member 12 relative to member 14, the shoulder 71 of member 14 contacts the impact member 69 thereby causing the ratchet 61 to be rotated counterclockwise another ninety degrees, thus positioning one end of arm 62 in chamber 65 for another cycle. Separation of members 12 and 14 upon injection of the gas allows spring 72 to pull pawl 66 to the lower position. A stop illustrated at 73 is provided to limit the movement of the pawl 66 to the left as it is pulled to the lower position.

Prior to the time that the combustible gas is injected into the chamber 13, the exhaust gases from a prior cycle are exhausted from the chamber, as now will be described. More particularly, a plurality of exhaust ports, one of which is illustrated at 80, is provided as well as an exhaust valve mechanism illustrated at 81 for exhausting the combustible gases. Upon ignition of the combustible gases, the member 14 is driven upward, for example, to a maximum height indicated by dotted line 82. During the upward movement of member 14, exhaust ports 80 are exposed to the chamber 13 to allow some of the spent gases to be exhausted. The remainder of the gases are exhausted by the exhaust valve system 81. This system comprises a ball valve 83 positioned in channel 84 which extends from the chamber 13 to the atmosphere. Positioned within the channel 84 is a solenoid which comprises a coil 85 and an armature 86 for controlling the ball valve 83. As guide 21 is being moved toward device 11, but prior to the time that members 24 and 25 are coupled together, the coil 85 is energized to move armature 86 upward to open the ball valve 83, thereby allowing exhaust gases to escape. As will become apparent hereinafter, at this time member 14 is free to move downward relative to member 12 and the weight of member 14 applies the force necessary to exhaust the spent gases.

The system for energizing the coil 85 comprises a ring-shaped terminal 87 supported on the face of flange 88 and coupled to a power supply 89 by way of current limit switch 90. Also provided is a contact 91 having one end extending through insulating member 92 and the other end 93 slidably supported in a metal tube-shaped terminal 94 which is coupled to coil 85. Insulating member 92 is biased away from member 12 by compression springs 95. Insulation (not shown) is provided to insulate member 94 from the member 12. As guide 21 moves toward the member 12, terminal 87 contacts the end of terminal 91, thereby completing a circuit from power supply 89, assuming that switch 115 is closed, to actuate the coil 85. As mentioned previously, this moves the armature 86 upward to vent the chamber 13 to the atmosphere.

As illustrated, terminal 91 also is coupled to shunting terminals 97. Upon further movement of the guide 21 to the right, terminals 97 contact member 12 and short circuits the coil 85, thereby de-energizing it. This allows the ball valve 83 to close prior to connection of the two members 24 and 25. Upon the short circuit being completed, additional current passes through the current limit switch 90 which then cuts off the current to terminal 87, as can be understood by those versed in the art. In this manner, the coil 85 is prevented from being energized when the guide 21 is backed off from member 12 to avoid loss of the combustible gas charge. The current limit switch 90 is reset to apply current to terminal 87 when it is desired to begin a new cycle.

There now will be described the control means for preventing the member 14 from falling downward following rebound upon combustion of the gas in chamber 13. In the following discussion, it is to be understood that the reel 33 rotates counterclockwise, due to the tension provided by spring 36 (FIGURE 1) to reel in the cable 34 as the member 14 is lifted by member 12 and rotates clockwise to reel out the cable 34 as the device 11 is dropped. The control means comprises a ratchet 100 fixedly coupled to reel 33 and a pawl 101. Solenoids 102 and 103 are provided respectively to force the pawl 101 away from and against the ratchet 100 to control the movement of the ratchet and hence of the reel 33. Prior to the time that the device 11 is dropped, the coil 104 of the solenoid 102 is actuated, thereby causing the armature 105 thereof to move the pawl 101 away from the ratchet. Upon rebound of the member 14 following combustion, however, the solenoid 102 is inactivated while the coil 106 of the solenoid 103 is energized to cause the armature 107 thereof to move the pawl 101 in contact with the ratchet 100. Thus, upon rebound of member 14, the reel 27 is allowed to reel in the cable 34 but is prevented from reeling out the cable 34, thereby preventing the member 14 from falling downward.

The system for controlling the solenoids 102 and 103 comprises relays 108 and 109 provided in the cathode circuits of tubes 110 and 111 of a bistable multivibrator 112. The multivibrator 112 in turn is controlled by positive and negative pulses produced from commutator 113 coupled to a D.-C. generator 114 which is driven by reel 33, as will be described hereinafter. As indicated previously, when the chamber 13 is being exhausted of spent gas via conduit 84 and filled with fresh gas, switch 115 is closed. Upon closure of switch 115, a positive voltage is applied to the grid of tube 110, thereby rendering tube 110 conducting and tube 111 nonconducting. Thus, current flows through cathode 116 of tube 110 to actuate coil 117 of relay 108 which closes switch 118. This completes a circuit from battery 119 to energize coil 105 of solenoid 102 thereby moving pawl 101 away from ratchet 100. Prior to the time that device 11 is dropped, switch 115 is opened. When the device 11 is dropped, reel 33 rotates clockwise to cause generator 114 to produce a positive voltage and hence commutator 113 to produce positive pulses. These pulses insure conduction of tube 110 while the device 11 is falling. After combustion of the gas and as member 14 rebounds upward, reel 33 rotates counterclockwise to cause commutator 113 to produce negative pulses. These pulses cause multivibrator 112 to flip to its other state wherein tube 111 conducts and tube 110 is nonconducting. Thus, current flows through cathode 120 of tube 111 to actuate coil 121 of relay 109 which closes switch 122. This completes a circuit from battery 123 to energize coil 107 of solenoid 103, thereby forcing pawl 101 against ratchet 100 to prevent clockwise movement. At the beginning of a new cycle, the operator closes switch 115 to reset multivibrator 112 whereby tube 110 conducts and tube 111 is nonconducting.

Referring to FIGURE 5, the driving means for the generator 114 comprises a gear 130 and a friction member 131 which rides on reel 33. Meshed with gear 130 is a bevel gear 132 which drives generator 114 as well as commutator 113. The commutator 113 includes a plurality of extending terminals 133 (see also FIGURE 4), each of which is coupled to center terminal 134. Terminal 134 in turn is coupled to the output of generator 114. Upon rotation of commutator 113, the terminals 133 periodically contact terminal 135 thereby applying pulses thereto, the polarity of which are dependent upon the direction of movement of reel 33. As mentioned above, clockwise rotation of reel 33 results in the production of a positive D.-C. output from generator 114 which is applied to commutator 113 for the production of positive pulses. Counterclockwise rotation of reel 33 results in the production of negative pulses from commutator 113.

As mentioned previously, additional means may be provided to vary the time of the combustion of the gas in chamber 13. Referring to FIGURE 6, this means comprises a magnet 140 embedded in the member 14 and a coil 141 positioned adjacent the magnet and coupled to spark plug 142. Upon downward movement of the member 14, the magnet 140 causes a current to be generated through the coil 141, thereby causing the spark plug 142 to be fired to ignite the gas in the chamber 13. Firing time may be varied by a vertical adjustment of the coil position. Although only one spark plug is shown, it is to be understood that a plurality of spark plugs may be employed.

In the system described above, it is to be understood that suitable piston rings, not shown, are provided between members 12 and 14 to form a seal between the members. As mentioned previously, the combustible gas preferably is a diesel fuel and air mixture which may be premixed and then applied to the input of hose 22.

In one embodiment, the current limit switch 90 is a commercially available switch and may be of the type manufactured by Assembly Products, Inc., Cleveland, Ohio.

Now that the invention has been described, modifications will become apparent to those skilled in the art and it is intended to cover such modifications as fall within the scope of the appended claims.

What is claimed is:

1. In a system for generating seismic waves in geophysical exploration, including a vehicle, a boom connected to said vehicle and extending upwardly and outwardly therefrom, pulley means near the upper extremity of said boom, a line extending through said pulley means, and reel means coupled to said line and adapted to bidirectionally reel said line, the combination therewith of:
   means forming a weight to be dropped from a desired height to the surface of the earth,
   said means being coupled to said line and including an explosive charge,
   said means having an impact end for impacting the earth, and
   means for initiating explosion of said charge upon contact of said impact end of said first-named means with the earth to generate a desired seismic wave.

2. A system for generating seismic waves useful in the investigation of subsurface formations comprising:
   a ground vehicle,
   means including a first member having a chamber formed therein,
   said first-named means forming a weight to be dropped to the surface of the earth,
   a flexible line having an end coupled to said first-named means,
   means coupled to said vehicle and to said line for raising said first-named means above the surface of the earth and for dropping said first-named means to the surface,
   said first member having a first end for impacting the earth when said first-named means is dropped,
   means for introducing a combustible gas in at least a portion of said chamber prior to the time that said first-named means is dropped, and
   means for igniting the combustible gas in said chamber following contact of said first member with the earth to generate a seismic wave.

3. The system of claim 2 wherein said last-named means includes:
   a second member slidably supported at least partially in said chamber,
   said portion of said chamber into which said combustible gas is introduced being intermediate said first end of said first member and an adjacent end of said second member,
   said second member moving toward said first end upon impact of said first member with the earth to compress said gas in said chamber and to ignite said gas spontaneously for the generation of the desired seismic wave.

4. The system of claim 2 including:
   electrical means for igniting said gas at a desired time after contact of said first member with the surface of the earth.

5. A system for generating seismic waves useful in the investigation of subsurface formations comprising:
   a ground vehicle,
   a first member having a chamber formed therein,
   a second member slidably supported at least partially in said chamber and having a weight greater than that of said first member,
   a flexible line having an end coupled to at least one of said members,
   means coupled to said vehicle and to said line for raising said members above the surface of the earth and for dropping said members to the surface,
   means for introducing a combustible gas in said chamber between a first end of said first member and an adjacent end of said second member prior to the time that said members are dropped,
   said first end of said first member being positioned to impact the earth when dropped,
   said second member moving toward said first end upon impact of said first member with the earth to compress the gas in said chamber, and
   means responsive to the movement of said second member for igniting said gas at a desired time after contact of said first member with the surface of the earth.

6. A system for repetitively generating seismic waves useful in the investigation of subsurface formations, comprising:
   means forming a weight to be dropped from a desired height to the surface of the earth,
   means coupled to said first-named means for repetitively raising said first-named means above the surface of the earth and dropping said first-named means to the surface of the earth thereby defining repetitive raising and dropping operations,
   means for applying an explosive charge to said first-named means prior to the time that said first-named means is dropped during each repetitive operation, and
   means for initiating the explosion of each charge applied to said first-named means upon contact of said first-named means with the surface of the earth when dropped during each repetitive operation to generate repetitive seismic waves.

7. The system of claim 6 comprising:
   a ground vehicle,
   said means for raising and dropping said first-named means being coupled to said ground vehicle and to said first-named means.

8. The system of claim 6 comprising:
   a ground vehicle,
   said means for raising and dropping said first-named means including a flexible line having an end coupled to said first-named means and reel means coupled to said vehicle and to said line.

9. A system for generating seismic waves useful in the investigation of subsurface formations comprising:
   a ground vehicle,
   means forming a weight and including an explosive charge to be dropped from a desired height to the surface of the earth,
   means coupled to said vehicle and to said weight means for raising said weight means above the surface of the earth and dropping said weight means to the surface of the earth, and
   means for initiating the explosion of said charge upon contact of said weight means with the earth when dropped to generate a desired seismic wave.

10. The system of claim 9 wherein said means for raising and dropping said weight means includes a flexible line having an end coupled to said weight means and reel means coupled to said vehicle and to said line.

11. A system for generating seismic waves useful in the investigation of subsurface formations comprising:
   a ground vehicle, means forming a weight to be dropped from a desired height to the surface of the earth, means coupled to said vehicle and to said weight means for raising said weight means above the surface of the earth and dropping said weight means to the surface of the earth, means for applying an explosive charge to said weight means prior to the time that said weight means is dropped, and means for initiating the explosion of said charge applied to said weight means upon contact of said weight means with the surface of the earth when dropped.

12. The system of claim 11 wherein said means for raising and dropping said weight means includes a flexible line having an end coupled to said weight means and reel means coupled to said vehicle and to said line.

References Cited by the Examiner
UNITED STATES PATENTS

| | | | |
|---|---|---|---|
| 2,339,261 | 1/1944 | Gibbons | 102—70 X |
| 2,368,038 | 1/1945 | Palmer | 102—6 X |
| 2,772,746 | 12/1956 | Merten | 181—.5 |

SAMUEL FEINBERG, *Primary Examiner.*

BENJAMIN A. BORCHELT, *Examiner.*

G. H. GLANZMAN, *Assistant Examiner.*